(12) United States Patent
Kolp

(10) Patent No.: US 7,067,594 B2
(45) Date of Patent: Jun. 27, 2006

(54) FUNCTIONALIZED ISOBUTYLENE-POLYENE COPOLYMERS AND DERIVATIVES THEREOF

(75) Inventor: Christopher J. Kolp, Richmond Heights, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 180 days.

(21) Appl. No.: 10/311,151

(22) PCT Filed: Jun. 21, 2001

(86) PCT No.: PCT/US01/19785

§ 371 (c)(1), (2), (4) Date: Aug. 15, 2003

(87) PCT Pub. No.: WO01/98387

PCT Pub. Date: Dec. 27, 2001

(65) Prior Publication Data

US 2004/0034175 A1 Feb. 19, 2004

Related U.S. Application Data

(60) Provisional application No. 60/213,290, filed on Jun. 22, 2000.

(51) Int. Cl.
*C08C 19/28* (2006.01)
*C08F 8/46* (2006.01)

(52) U.S. Cl. ............ 525/386; 525/360; 525/374; 525/379; 525/382; 525/383; 525/384; 526/335; 526/348.7; 526/328

(58) Field of Classification Search ........ 526/335, 526/348.7, 328; 525/360, 374, 379, 382, 525/383, 384, 386
See application file for complete search history.

(56) References Cited

U.S. PATENT DOCUMENTS

| | | | |
|---|---|---|---|
| 3,215,707 A | 11/1965 | Rense | 260/326.3 |
| 3,219,666 A | 11/1965 | Norman et al. | 260/268 |
| 3,444,170 A | 5/1969 | Norman et al. | 260/268 |
| 4,080,493 A | 3/1978 | Yasui et al. | 526/192 |
| 4,081,388 A | 3/1978 | Soula et al. | 252/51.5 A |
| 4,234,435 A * | 11/1980 | Meinhardt et al. | 508/192 |
| 4,863,624 A | 9/1989 | Emert et al. | 252/51.5 A |
| 4,915,857 A | 4/1990 | Emert et al. | 252/32.7 E |
| 4,952,328 A | 8/1990 | Davis et al. | 252/32.7 E |
| 5,464,549 A | 11/1995 | Sieberth | 252/51.5 A |
| 5,556,932 A | 9/1996 | Rath et al. | 526/339 |

FOREIGN PATENT DOCUMENTS

| | | | |
|---|---|---|---|
| EP | 208 560 | * | 1/1987 |
| EP | 217 618 | | 4/1987 |
| EP | 264 247 | * | 4/1988 |
| EP | 440 506 | | 8/1991 |
| FR | 2 402 675 | * | 4/1979 |
| GB | 2 231 873 | * | 11/1990 |
| WO | WO 94/13761 | | 6/1994 |

* cited by examiner

*Primary Examiner*—Ling-Sui Choi

(74) *Attorney, Agent, or Firm*—David M. Shold; Michael F. Esposito

(57) ABSTRACT

A carboxylic derivative composition derived from a carboxylated isobutylene-polyene copolymer having n ranging from about 200 to about 10,000, said copolymer having thereon from about 0.8 to about 7 moles per mole of copolymer of groups derived from at least one α,β-unsaturated carboxylic acid or reactive equivalent thereof, reacted with at least one of (a) amines characterized by the presence within their structure of at least one condensable H—N< group, (b) alcohols. (c) reactive metals or reactive metal compounds, and (d) a combination of two or more of any of (a) through (c), the components of (d) having been reacted with the carboxylated isobutylene-polyene copolymer simultaneously or sequentially, in any order. Also, a process for preparing carboxylic derivative compositions, additive concentrates and lubricating oil compositions containing the carboxylic derivative compositions and methods for increasing the viscosity index of lubricating oil compositions.

20 Claims, No Drawings

US 7,067,594 B2

FUNCTIONALIZED ISOBUTYLENE-POLYENE COPOLYMERS AND DERIVATIVES THEREOF

This application claims the benefit of Provisional application No. 60/213,290, Jun. 22, 2000.

FIELD OF THE INVENTION

This invention relates to functionalized isobutylene-polyene copolymers and derivatives thereof useful as additives for lubricating oil and fuel compositions.

BACKGROUND OF THE INVENTION

Many types of additives are used to improve lubricating oil and fuel compositions. Such additives include, but are not limited to dispersants and detergents of the ashless and ash-containing variety, oxidation inhibitors, anti-wear additives, friction modifiers, and the like. Such materials are well known in the art and are described in many publications, for example, Smalheer, et al, "Lubricant Additives", Lezius-Hiles Co., Cleveland, Ohio, USA (1967); M. W. Ranney, Ed., "Lubricant Additives", Noyes Data Corp., Park Ridge, N.J., USA (1973); M. J. Satriana, Ed., "Synthetic Oils and Lubricant Additives, Advances since 1979, Noyes Data Corp., Park Ridge N.J., USA (1982), W. C. Gergel, "Lubricant Additive Chemistry", Publication 694-320-65R1 of the Lubrizol Corp., Wickliffe, Ohio, USA (1994); and W. C. Gergel et al, "Lubrication Theory and Practice" Publication 794-320-59R3 of the Lubrizol Corp., Wickliffe, Ohio, USA (1994); and in numerous United States patents, for example Chamberlin, II, U.S. Pat. No. 4,326,972, Schroeck et al, U.S. Pat. No. 4,904,401, and Ripple et al, U.S. Pat. No. 4,981,602. Many such additives are frequently derived from carboxylic reactants, for example, acids, esters, anhydrides, lactones, and others.

Specific examples of commonly used carboxylic compounds used as intermediates for preparing lubricating oil additives include alkyl-and alkenyl substituted succinic acids and anhydrides, polyolefin substituted carboxylic acids, aromatic acids, such as salicylic acids, and others. Illustrative carboxylic compounds are described in Meinhardt, et al, U.S. Pat. No. 4,234,435; Norman et al, U.S. Pat. No. 3,172,892; LeSuer et al, U.S. Pat. No. 3,454,607 and Rense, U.S. Pat. No. 3,215,707.

Butyl rubbers are polymers of isobutylene and dienes, usually isoprene or butadiene. Butyl rubbers are generally high molecular weight elastomers. At page 392 of Kirk-Othmer Concise Encyclopedia of Chemical Technology, Wiley-Interscience, New York (1985) it is stated that the isoprene in butyl rubber is linked predominantly by 1,4-addition at a level of from about 0.25 to about 2.5 mol per 100 mol of monomers.

Rath et al in U.S. Pat. No. 5,556,932 teach chlorine-free non-drying copolymers of isobutene with $C_4$–$C_{10}$ dienes having isolated or conjugated double bonds and containing at least 60 mol % of terminal double bonds and a process for preparing same. The polymer is prepared by cationic polymerization wherein the isobutylene is polymerized with the diene with the aid of $BF_3$-alcohol complex.

Rath et al refer to GB-A 2,231,873 A which relates to oil soluble dispersants useful as luboil additives. These comprise a polyolefin substituted dicarboxylic acid or anhydride in which the $M_n$ of the polyolefin is from 1500 to 5000 and the molar equivalent ratio of dicarboxylic groups to equivalents of polyolefin substituent is less than 1.3. The polyolefin substituted dicarboxylic acid or anhydride can be further reacted with amines or alcohols to form other dispersant additives. Rath teaches the copolymer can be reacted according to GB-A 2,231,873 A to give fuel and lubricating oil additives.

Many carboxylic intermediates used in the preparation of lubricating oil additives contain chlorine. While the amount of chlorine present is often only a very small amount of the total weight of the intermediate, the chlorine frequently is carried over into the carboxylic derivative which is desired as an additive. For a variety of reasons, including environmental reasons, the industry has been making efforts to reduce or to eliminate-chlorine from additives designed for use as lubricant or fuel additives.

Accordingly, it is desirable to provide low chlorine or chlorine free intermediates which can be used to prepare low chlorine or chlorine free derivatives for use in lubricants and fuels.

Lubricating oils are used over a broad range of conditions. Particularly difficult are operations under high speed and high temperature and low speed and short duration. The former often results in oxidation of the lubricant while the latter often results in the formation of water-containing sludge. Both of these result in the presence of deposits which can adversely affect engine operation. Dispersants and detergents of the ash containing and ashless type are frequently used to keep such deposits in suspension.

It is also desirable that a lubricating oil composition maintain a relatively stable viscosity over a wide range of temperatures. Viscosity improvers are often used to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

The compositions of the instant invention serve as dispersants for fuels and lubricating oil compositions. It has now been discovered that multigrade lubricating oil compositions, that is compositions which display excellent viscosity characteristics over a wide range of temperatures, can be prepared employing the compositions of this invention.

Typically, multigrade lubricating oil compositions include at least one polymeric viscosity improving agent, frequently a hydrocarbon polymer. Frequently, the amount of polymeric viscosity improver needed to obtain multigrade lubricating oil compositions can be significantly reduced when the compositions of the instant invention are employed as dispersants compared to the amount of polymeric viscosity improver needed to obtain similar viscosity improving benefit when conventional dispersants are used.

Yet another advantage is that with a reduction in the amount of polymeric viscosity improver, the amount of volatile lower viscosity oils in the lubricant is reduced.

A surprising benefit is that the derivatives of this invention provide superior viscometrics when used in lubricants compared to the viscometrics observed when corresponding derivatives derived from high vinylidene polyisobutylenes are employed.

Another surprising advantage of the present invention is the ease of processing during the reaction of the polyene-isobutylene copolymer with α,β-unsaturated carboxylic acylating agents. The ease of processing is better than that observed employing high terminal vinylidene polyisobutylene. Typically, an added polymeric viscosity improver is needed in order to obtain multigrade lubricating oil compositions. These benefits arise without depreciation of dispersancy and low temperature performance.

It has generally been observed that lubricating oil compositions containing highly basic dispersants, i.e., those prepared employing a high level of amine nitrogen per carbonyl of the intermediate frequently suffer from poor elastomer seal, particularly fluorocarbon elastomer performance. Over time, these seals are susceptible to deterioration caused by lubricating oils. Seal deterioration results in oil leaking from the engine. A lubricating oil composition that degrades elastomer seals in an engine is unacceptable to engine manufacturers and has limited value.

Nitrogen containing dispersants of the instant invention have substantially improved seal performance as measured by the Volkswagen PV 3344 Seal Test. Using this test, a fluoroelastomer material is immersed in the oil to be evaluated at 150° C. for a total of 282 hours, the oil being replaced with fresh oil every 94 hours. On termination of the test, the condition of the elastomer sample is evaluated, including the presence of cracking, and the mechanical properties are examined, including tensile strength and rupture elongation.

The carboxylic derivative compositions of this invention provide to lubricants, soot handling characteristics comparable to those provided by much higher Total Base Number (TBN) dispersants, which high TBN dispersants typically do not perform as well on seals. The present invention provides a method for reducing soot induced thickening of lubricating oil compositions comprising incorporating in said lubricating oil composition a carboxylic derivative compositions of this invention.

At higher nitrogen to carbonyl ratios, it has generally been difficult to obtain products that provide significant thickening to a lubricant. Highly basic nitrogen containing compositions of this invention can be prepared that are more viscous and which provide lubricants with additional thickening, employing significantly reduced amounts of additional viscosity improver or even without additional viscosity improver.

With use, a lubricant's viscosity will generally tend to slowly increase. This increase, sometimes referred to as vis-creep, tends to arise due to build up in the lubricant, over time, of soot, insoluble oxidation products and/or other combustion products. In this manner, viscosity is related to lubricant quality. Such an increase in viscosity is indicative of quality degradation.

Lubricants containing carboxylic compositions of this invention tend to resist this undesirable viscosity increase.

SUMMARY OF THE INVENTION

The present invention is directed to a carboxylic derivative composition derived from a carboxylated isobutylene-polyene, preferably isobutylene-diene copolymer having $\overline{M}_n$ ranging from about 200 to about 10,000, said copolymer having thereon from about 0.8 to about 7 moles per mole of copolymer of groups derived from at least one α,β-unsaturated carboxylic acid or reactive equivalent thereof, reacted with at least one of (a) amines characterized by the presence within their structure of at least one condensable H—N< group, (b) alcohols, (c) reactive metals or reactive metal compounds, and (d) a combination of two or more of any of (a) through (c), the components of (d) having been reacted with the carboxylated isobutylene-polyene copolymer simultaneously or sequentially, in any order. The invention is also directed to a process for preparing carboxylic derivative compositions, additive concentrates and lubricating oil compositions containing the carboxylic derivative compositions and methods for increasing the viscosity index of lubricating oil compositions.

DETAILED DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

It must be noted that as used in this specification and appended claims, the singular forms also include the plural unless the context clearly dictates otherwise. Thus the singular forms "a", "an", and "the" include the plural; for example "an amine" includes mixtures of amines of the same type. As another example the singular form "amine" is intended to include both singular and plural unless the context clearly indicates otherwise.

The Copolymer

The carboxylic derivative compositions are derived from isobutylene-polyene, preferably isobutylene-diene copolymers having $\overline{M}_n$ ranging from about 200 to about 10,000, more often from about 200 to about 8,000 and preferably from about 500 to about 5,000. A mole of copolymer is defined herein as the $\overline{M}_n$ of the copolymer, expressed in grams.

Molecular weights of the copolymers are determined using well known methods described in the literature. Examples of procedures for determining molecular weights are gel permeation chromatography (GPC) (also known as size-exclusion chromatography), light scattering, and vapor phase osmometry (VPO). The GPC technique employs standard materials against which the samples are compared. For best results, standards that are chemically similar to those of the sample are used. For example, for polystyrene polymers, a polystyrene standard, preferably of similar molecular weight, is employed. When standards are dissimilar to the sample, generally relative molecular weights of related polymers can be determined. For example, using a polystyrene standard, relative, but not absolute, molecular weights of a series of polymethacrylates may be determined. These and other procedures are described in numerous publications including:

P. J. Flory, "Principles of Polymer Chemistry", Cornell University Press (1953), Chapter VII, pp 266–316, and "Macromolecules, an Introduction to Polymer Science", F. A. Bovey and F. H. Winslow, Editors, Academic Press (1979), pp 296–312.

W. W. Yau, J. J. Kirkland and D. D. Bly, "Modern Size Exclusion Liquid Chromatography", John Wiley and Sons, New York, 1979.

Copolymers of this invention can be prepared employing cationic polymerization catalysts. Lewis acids are particularly preferred catalysts. These include metal halides, for example $AlCl_3$, $BF_3$, $SnCl_4$, $SbCl_5$, $ZnCl_2$, $TiCl_4$, and $PCl_5$, organometallic derivatives, for example $RAlCl_2$, $R_2AlCl$, $R_3Al$, and oxyhalides for example $POCl_3$, $CrO_2Cl$, $SOCl_2$, and $VOCl_3$. Particularly preferred are $AlCl_3$, $EtAlCl_2$ and $Et_2AlCl$. Initiation by Lewis acids requires or tends to proceed faster in the presence of a proton donor such as water, hydrogen halide, alcohol and carboxylic acid or a carbocation donor such as t-butyl chloride or triphenylmethyl fluoride. $AlCl_3$ is generally easier to use than $BF_3$. $AlCl_3$ is also less toxic than BF3. Odian, in 'Principles of Polymerization', 2nd ed., Wiley-Interscience, New York, 1970, pp 342–325 discusses cationic polymerization including catalysts used in the process.

Copolymers are defined herein as polymers derived from at least two different monomers. Thus, as defined herein, copolymers include polymers derived from, for example, 2, 3, 4 or more different monomers, more often 2 or 3 different monomers. Accordingly, copolymers of the instant invention are derived from isobutylene and at least one polyene, preferably a diene which may have conjugated or isolated double bonds. More often the polyenes are conjugated dienes. Especially preferred dienes are isoprene, piperylene and 1,3-butadiene. Terpolymers derived from isobutylene, isoprene and 1,3-butadiene are useful.

Sources of isobutylene useful in the preparation of the copolymers of this invention range from substantially pure isobutylene (isobutene) to $C_4$- raffinate of a catalytic cracker or ethylene plant butane/butene stream. The raffinate is typically a $C_4$ refinery stream having a butene content of 35 to 75 weight percent and isobutylene content of 15 to 60 weight percent. When the raffinate is used, the process is designed such that primarily isobutylene from the raffinate is used in the reaction and the remaining components of the raffinate are returned to the supplier.

Useful polyenes are conjugated and non-conjugated polyenes, preferably conjugated polyenes. Useful dienes include 1,3-butadiene, piperylene, isoprene, methylisoprene, dicyclopentadiene, 1,3-pentadiene, 2,3-dimethyl-1,3-butadiene, trans-2-methyl-1,3-pentadiene, cyclopentadiene, 1,5-hexadiene, 2,5-dimethyl-2,4-hexadiene, 1,5-heptadiene, 1,7-octadiene, 5-ethylidene-2-norbornene, and the like, trienes such as 1,3,5-cycloheptatriene, 2,6-dimethyl-2,4,6-octatriene, myrcene, 1-iso-propylidene-3a,4,7,7a-tetrahydroindene, 1-isopropyli-dene- and 2-(2-methylene-4-methyl-3-pentenyl)[2.2.1]bicyclo-5-heptene and higher polyenes such as cyclooctatetraene. Dienes, particularly conjugated dienes, are preferred. Especially preferred are 1,3-butadiene, piperylene and isoprene.

These polyenes are generally commercially available. They are also available as components of refinery raffinates, usually in minor amounts.

The copolymer usually comprises an average of from about 0.25 to about 5 moles, frequently from about 0.5 to about 2.5 moles, of units derived from polyene, preferably diene, per mole based on $\overline{M}_n$ of copolymer. The copolymer usually contains an average of from about 0.9, often from about 1, more often from about 1.2 up to about 5, preferably up to about 4 often up to about 3 carbon to carbon double bonds per mole thereof. Preferably, the copolymer comprises from about 1.3, more often from about 1.4 up to about 3 carbon to carbon double bonds per mole of copolymer.

The amount of C=C unsaturation can be determined from $^1$NMR spectra.

Molecular weights of the polymers are typically determined by gel permeation chromatography (GPC). Polystyrene calibration standards are often used although known polyisobutylene can also be used as a standard. $\overline{M}_n$ (number average molecular weight) and $\overline{M}_w$ (weight average molecular weight) are determined from comparative elution volume data.

The amount of C=C unsaturation relative to molecular weight is determined by comparing GPC and NMR data.

The exact nature of the end group is not known. Kuntz and Rose report in J. Polym. Sci.: Part A: Polymer Chemistry, 27, 107–124 (1989) strong evidence for termination in an isoprene derived unit. Specifically they examined the polymerization of isobutylene with 1,4-$^{13}$C-isoprene in methyl chloride solvent using organoaluminum halide initiators at −92° C. Kuntz and Rose's data indicated the isoprene derived unit was a conjugated diene. Finally it is known that conventional polyisobutylene prepared employing aluminum chloride catalyst is terminated in an olefin. Therefore while not wishing to be bound by theory, it is believed that from about 25% to about 100% of the polymer molecules have terminal double bonds"

The isobutylene-polyene copolymers employed to prepare the compositions of the instant invention are different from conventional polyisobutylene prepared employing aluminum chloride catalyst. They can be made substantially free of tri- and tetra- substituted double bonds observed in traditional polyisobutylene. Reactivity with α,β-unsaturated carboxylic reagents is improved.

The copolymers are also different from the high vinylidene polyisobutylenes sold, for example, under the tradenames ULTRAVIS® (BP Chemicals) and GLISSOPAL® (BASF) and described in DeGonia et al, U.S. Pat. Nos. 5,071,919; 5,137,978; 5,137,980; and in Rath, U.S. Pat. Nos. 5,286,823 and 5,408,018, and in published European patent application EP 646103-A1, each of which is expressly incorporated herein by reference. Conversion of the copolymers of this invention to dispersants by reaction with α,β-unsaturated carboxylic reagents and subsequently with, for example, an amine, results in materials having improved viscometrics compared to similar dispersants derived from the high vinylidene polyisobutylenes.

The isobutylene-polyene copolymers of this invention permit greater flexibility in the design of the polymer and ultimately, derivatives thereof. The use of more than one monomer permits the design of a polymer having particularly desired properties.

Polymerizations are usually conducted at temperatures ranging from about −78° C. to about 50° C. Reaction pressures range from about atmospheric to about 50 pounds per square inch, gauge (psig), preferably from about 8 to about 17 psig. The reactivity of the polyene, preferably diene, determines the amount charged relative to isobutylene. When the reactivity of the polyene is similar to the reactivity of isobutylene, the mole ratio of polyene charged is similar to that incorporated into the polymer. For example, in the case of isoprene, a relative mole ratio of 9% leads to about 4.1% isoprene incorporated into the copolymer as determined by $^1$H NMR. For polyenes having reactivities much less than that of isobutylene, the mole ratio of polyene charged is considerably greater than the amount of polyene incorporated into the polymer, often 20 times greater, and sometimes even more. For example, in copolymerization of isobutylene and butadiene, butadiene is charged at a relative monomer mole ratio of about 65% in order to incorporate 3.1% butadiene as determined by $^1$H NMR. Dry solvents are frequently used during the polymerizations. Solvents can solubilize the polymer and provide a means for controlling the reaction temperature. Reaction times usually depend on the scale of the reaction and the amount of cooling that can be delivered to the reactor. The reaction is quenched with methanol, water or dilute caustic solution; washed with water then solvents and light ends, including lower-boiling by-products are removed by stripping, usually at elevated temperature and reduced pressure, frequently to about 1 mm Hg pressure.

α,β-Unsaturated Carboxylic Acid

The carboxylic derivative compositions of this invention are prepared from carboxylated isobutylene-polyene, preferably diene, copolymers. Carboxylation is effected by reacting the copolymer with at least one α,β-unsaturated carboxylic reactant or reactive equivalent thereof. The carboxylated copolymer contains from about 0.8 up to about 7 moles, preferably from about 1 to about 3 moles, per mole of copolymer, of groups derived from at least one α,β-unsaturated carboxylic reactant or reactive equivalent thereof.

A reactive equivalent of an α,β-unsaturated carboxylic reactant is a reactant that will react in a fashion similar to a carboxylic acid to form derivatives that are essentially the same as those obtained from the carboxylic acid. For example, anhydrides, lower alkyl esters and acyl halides will react with amines to form substantially similar products as will the corresponding acids. Anhydrides, lower alkyl esters and acyl halides are all considered to be reactive equivalents to the corresponding acid.

The α,β-ethylenically unsaturated carboxylic acids and reactive equivalents thereof are well know in the art. The most commonly used materials contain from two to about 20 carbon atoms exclusive of carbonyl carbons. These include such acids as acrylic acid, methacrylic acid, maleic acid, fumaric acid, crotonic acid, citraconic acid, itaconic acid and mesaconic acid, as well as their anhydrides, halides and esters (especially the lower alkyl esters, the term "lower alkyl" meaning alkyl groups having up to 7 carbon atoms). Preferred are acrylic compounds, maleic compounds, fumaric compounds and itaconic compounds. Especially preferred compounds are the α,β-olefinically unsaturated carboxylic acids, especially those containing at least two carboxy groups and more preferably dicarboxylic acids, and their derivatives. Maleic acid and maleic anhydride, especially the latter, are particularly preferred.

In order to minimize the amount of chlorine present in the carboxylic derivatives of this invention, it is preferred to avoid the use of chlorine or chlorine containing reactants, promoters, catalysts, etc. whenever possible. Accordingly, it is preferred to prepare the carboxylated copolymer by a thermal reaction wherein the copolymer and the alpha-beta-olefinic carboxylic acids or reactive equivalents thereof are reacted by simply combining and heating the reactants at an elevated temperature, usually from about 150° C. to about 230° C., preferably from about 180° C. until the reaction is completed.

Alternatively, the reaction may be conducted in the presence of chlorine. However, when chlorine is used during the reaction, the resulting carboxylated interpolymer and the carboxylic derivative composition derived therefrom generally contain small amounts of chlorine. When chlorine is used during preparation of the carboxylated copolymer it is used in amounts ranging from about 0.2 to about 2.5 moles Cl$_2$ per mole of carboxylic reactant.

Amine/Alcohol/Reactive Metal

The carboxylic derivative compositions of this invention are obtained by reacting the carboxylated copolymer with at least one of (a) amines characterized by the presence within their structure of at least one condensable H—N< group, (b) alcohols, (c) reactive metals or reactive metal compounds, and (d) a combination of two or more of any of (a) through (c), the components of (d) having been reacted with the carboxylated isobutylene-polyene copolymer simultaneously or sequentially, in any order.

Amine

The above-described carboxylic compositions may be reacted with (a) amines having at least one H—N< group to form nitrogen-containing carboxylic derivatives of the present invention which are useful as dispersants in lubricants. The amines may be monoamines or polyamines, typically polyamines, preferably ethylene amines, amine bottoms or amine condensates. The amines can be aliphatic, cycloaliphatic, aromatic or heterocyclic, including aliphatic-substituted cycloaliphatic, aliphatic-substituted aromatic, aliphatic-substituted heterocyclic, cycloaliphatic-substituted aliphatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclic, and heterocyclic-substituted aromatic amines and may be saturated or unsaturated.

Monoamines useful in this invention generally contain from 1 to about 24 carbon atoms, preferably 1 to about 12, and more preferably 1 to about 6. Examples of primary monoamines useful in the present invention include methylamine, propylamine, butylamine, cyclopentylamine, dodecylamine, allylamine, cocoamine and stearylamine. Examples of secondary monoamines include dimethylamine, dipropylamine, dicyclopentylamine, methylbutylamine, etc.

The monoamine may be an alkanol amine represented by the formulae:

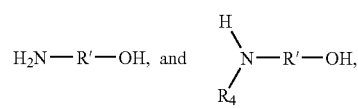

wherein each R$_4$ is independently a hydrocarbyl group of one to about 22 carbon atoms or hydroxyhydrocarbyl group of two to about 22 carbon atoms, preferably one to about four, and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. When two $R_4$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R_4$ is independently a methyl, ethyl, propyl, butyl, pentyl or hexyl group.

Examples of alkanolamines include mono- and di- ethanolamine, ethylethanolamine, monomethylethanolamine, etc.

The hydroxyamines can also be ether N-(hydroxyhydrocarbyl) amines. These are hydroxy poly(hydrocarbyloxy) analogs of the above-described hydroxy amines (these analogs also include hydroxyl-substituted oxyallcylene analogs). Such N-(hydroxyhydrocarbyl) amines can be conveniently prepared, for example, by reaction of epoxides with aforedescribed amines and can be represented by the formulae:

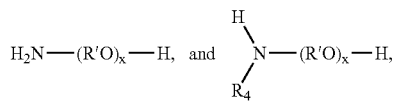

wherein x is a number from about 2 to about 15 and $R_4$ and R' are as described above. $R_4$ may also be a hydroxypoly (hydrocarbyloxy) group.

Other useful amines include ether amines of the general formula

wherein $R_6$ is a hydrocarbyl group, preferably an aliphatic group, more preferably an alkyl group, containing from 1 to about 24 carbon atoms, $R^1$ is a divalent hydrocarbyl group, preferably an alkylene group, containing from two to about 18 carbon atoms, more preferably two to about 4 carbon atoms and $R_7$ is H or hydrocarbyl, preferably H or aliphatic, more preferably H or alkyl, more preferably H. When $R_7$ is not H, then it preferably is alkyl containing from one to about 24 carbon atoms. Especially preferred ether amines are those available under the name SURFAM® produced and marketed by Sea Land Chemical Co., Westlake, Ohio.

The amine may also be a polyamine. The polyamine may be aliphatic, cycloaliphatic, heterocyclic or aromatic. Examples of useful polyamines include alkylene polyamines, hydroxy containing polyamines, polyoxyalkylene polyamines, arylpolyamines, and heterocyclic polyamines.

Alkylene polyamines are represented by the formula

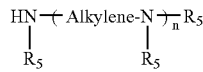

wherein n has an average value between about 1 and about 10, preferably about 2 to about 7, more preferably about 2 to about 5, and the "Alkylene" group has from 1 to about 10 carbon atoms, preferably about 2 to about 6, more preferably about 2 to about 4. Each $R_5$ is independently hydrogen, an aliphatic group or a hydroxy-substituted- or amino-substituted- aliphatic group of up to about 30 carbon atoms. Preferably $R_5$ is H or lower alkyl, most preferably, H.

Alkylene polyamines include methylene-, ethylene-, butylene-, propylene-, pentylene- and other polyamines. Higher homologs and related heterocyclic amines such as piperazines and N-amino alkyl-substituted piperazines are also included. Specific examples of such polyamines are ethylene diamine, diethylene triamine, triethylene tetramine, tris-(2-aminoethyl)amine, propylene diamine, N,N-dimethylaminopropylamine, trimethylene diamine, tripropylene tetramine, tetraethylene pentamine, hexaethylene heptamine, pentaethylenehexamine, aminoethyl piperazine, etc.

Higher homologs obtained by condensing two or more of the above-noted alkylene amines are similarly useful as are mixtures of two or more of the aforedescribed polyamines.

Ethylene polyamines, such as some of those mentioned above, are preferred. They are described in detail under the heading "Diamines and Higher Amines" in Kirk Othmer's "Encyclopedia of Chemical Technology", 4th. Edition, Vol. 8, pages 74–108, John Wiley and Sons, New York (1993) and in Meinhardt, et al, U.S. Pat. No. 4,234,435, both of which are hereby incorporated herein by reference for disclosure of useful polyamines. Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful. Heavy polyamines, such as described in U.S. Pat. No. 5,936,041 are also useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Tex., designated "E-100" has a specific gravity at 15.6° C. of 1.0168, % nitrogen of 33.15 and a viscosity at 40° C. of 121 centistokes. Gas chromatography analysis shows such a sample contains about 0.93% "Light Ends" (most probably diethylenetriamine), 0.72% triethylenetetramine, 21.74% tetraethylenepentamine and 76.61% pentaethylene hexamine and higher (by weight). These alkylene polyamine bottoms include cyclic condensation products such as piperazine and higher analogs of diethylenetriamine, triethylenetetramine and the like.

Another useful polyamine is a condensation product obtained by reaction of at least one hydroxy compound with at least one polyamine reactant containing at least one primary or secondary amino group. The hydroxy compounds are preferably polyhydric alcohols and amines. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric amines include tri-(hydroxypropyl) amine, tris-(hydroxymethyl)amino methane, 2-amino-2-methyl-1,3-propanediol, N,N,N',N'-tetrakis(2-hydroxypropyl) ethylenediamine, and N,N,N',N'-tetrakis(2-hydroxyethyl) ethylenediamine.

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C. in the presence of an acid catalyst.

The amine condensates and methods of making the same are described in Steckel (U.S. Pat. No. 5,053,152) which is incorporated by reference for its disclosure to the condensates and methods of making amine condensates.

The polyamines may be hydroxy-containing polyamines. These include hydroxy-containing polyamine analogs of hydroxy monoamines, particularly alkoxylated alkylenepolyamines. Such polyamines can be made by reacting the above-described alkylene amines with one or more of the above-described alkylene oxides.

Specific examples of alkoxylated alkylenepolyamines include N-(2-hydroxyethyl) ethylenediamine, N,N-di-(2-hydroxyethyl)-ethylenediamine, 1-(2-hydroxyethyl) piperazine, mono-(hydroxypropyl)-substituted tetraethylenepentamine, N-(3-hydroxybutyl)-tetramethylene diamine, etc. Higher homologs obtained by condensation of the above illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

The polyamines may be polyoxyalkylene polyamines, including polyoxyethylene and polyoxypropylene diamines and the polyoxypropylene triamines having average molecular weights ranging from about 200 to about 2000. Polyoxyalkylene polyamines, including polyoxyethylene-polyoxypropylene polyamines, are commercially available, for example under the tradename JEFFAMINE® from Texaco Chemical Co. U.S. Pat. Nos. 3,804,763 and 3,948,800 contain disclosures of polyoxyalkylene polyamines and are incorporated herein by reference for their disclosure of such materials.

In another embodiment, the polyamine may be a heterocyclic polyamine. The heterocyclic polyamines include aziridines, azetidines, azolidines, tetra- and dihydropyridines, pyrroles, indoles, piperidines, imidazoles, di- and tetrahydroimidazoles, piperaznes, isoindoles, purines, N-aminoalkyl-thiomorpholines, N-aminoalkylmorpholines, N-aminoalkyl-piperazines, N,N'-bisaminoalkyl piperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, or nitrogen with oxygen and/or sulfur in the hetero ring, especially the piperidines, piperazines, thiomorpholines, morpholines, pyrrolidines, and the like. Piperidine, aminoalkylsubstituted piperidines, piperazine, aminoalkylsubstituted piperazines, morpholine, aminoalkylsubstituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-amino-ethylpiperazine, and N,N'-diaminoethyl-piperazine. Hydroxy alkyl substituted heterocyclic polyamines are also useful. Examples include N-hydroxyethylpiperazine and the like.

Hydrazine and substituted-hydrazine can also be used to form nitrogen-containing carboxylic dispersants. At least one of the nitrogens in the hydrazine must contain a hydrogen directly bonded thereto. Preferably there are at least two hydrogens bonded directly to hydrazine nitrogen and, more preferably, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethyl-hydrazine, N,N'-dimethyl-hydrazine, phenylhydrazine, N-phenyl-N'-ethylhydrazine, N-(para-tolyl)-N'-(n-butyl)-hydrazine, N-(para-nitrophenyl)-hydrazine, N-(para-nitrophenyl)-N-methyl-hydrazine, N,N'-di(para-chlorophenol)-hydrazine, N-phenyl-N'-cyclohexylhydrazine, amino guanidine bicarbonate, and the like.

The carboxylic derivative compositions produced by reacting the carboxylated copolymers of the invention and the amines described above are acylated amines which include amine salts, amides, imides and imidazolines as well as mixtures thereof. To prepare the carboxylic derivative compositions from the amines, one or more of the carboxylated copolymers and one or more amines are heated, optionally in the presence of a normally liquid, substantially inert organic liquid solvent/diluent, at temperatures in the range of from about 80° C. up to the decomposition point of any of the reactants or the product, but normally at temperatures in the range of from about 100° C. up to about 300° C., provided 300° C. does not exceed the decomposition point of a reactant or the product. Temperatures of about 125° C. to about 250° C. are normally used. The carboxylic composition and the amine are reacted in an amount sufficient to provide from about one-half equivalent up to two moles of amine per equivalent of the carboxylic composition. In another embodiment, the carboxylic composition is reacted with from about one-half equivalent up to one mole of amine per equivalent of the carboxylic composition. For the purpose of this invention, an equivalent of amine is that amount of amine corresponding to the total weight of amine divided by the total number of nitrogens present having at least one H—N< group. Thus, octyl amine has an equivalent weight equal to its molecular weight; ethylenediamine has an equivalent weight equal to one-half its molecular weight, and aminoethylpiperazine, with 3 nitrogen atoms but only two having at least one H—N< group, has an equivalent weight equal to one-half of its molecular weight.

U.S. Pat. Nos. 3,172,892; 3,219,666 and 3,272,746, each of which is expressly incorporated herein by reference, provide detailed procedures for reacting amines with hydrocarbon based acylating agents.

Alcohols

The carboxylated copolymer may be reacted with (b) alcohols. Alcohols useful as (b) in preparing carboxylic derivative compositions of this invention from the carboxylated copolymers previously described include those compounds of the general formula

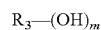

wherein $R_3$ is a monovalent or polyvalent organic radical joined to the —OH groups through carbon-to-oxygen bonds (that is,

wherein the carbon is not part of a carbonyl group) and m is an integer of from 1 to about 10, usually 2 to about 6. As with the amine reactant (a), the alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for polyoxyalkylene alcohols, the mono- and polyhydric alcohols corresponding to the above formula will usually contain not more than about 40 carbon atoms and generally not more than about 20 carbon atoms. The alcohols may contain non-hydrocarbon substituents of the same type mentioned with respect to the amines above, that is, non-hydrocarbon substituents which do not interfere with the reaction of the alcohols with the acylating reagents of this invention. In general, polyhydric alcohols are preferred.

The monohydric and polyhydric alcohols useful as (b) include monohydroxy and polyhydroxy aromatic compounds. Monohydric and polyhydric phenols and naphthols are preferred hydroxyaromatic compounds. These hydroxy-substituted aromatic compounds may contain other substituents in addition to the hydroxy substituents such as halo, alkyl, alkenyl, alkoxy, alkyl-mercapto, nitro and the like. Usually, the hydroxy aromatic compound will contain. 1 to 4 hydroxy groups. The aromatic hydroxy compounds are illustrated by the following specific examples: phenol, beta-naphthol, cresols, resorcinol, catechol, carvacrol, thymol, eugenol, p,p'-dihydroxybiphenyl, hydroquinone, pyrogallol, phloroglucinol, orcin, guaicol, 2,4-dibutylphenol, propene-tetramer-substituted phenol, didodecylphenol, 4,4'-methylene-bis-phenol, alpha-decyl-beta-naphthol, polyisobutenyl-(molecular weight of about 1000)-substituted phenol, the condensation product of heptylphenol with 0.5 mole of formaldehyde, the condensation product of octylphenol with acetone, di(hydroxyphenyl)oxide, di(hydroxyphenyl)sulfide, di(hydroxyphenyl)disulfide, and 4-cyclohexylphenol. Phenol itself and aliphatic hydrocarbon-substituted phenols, e.g., alkylated phenols having up to 3 aliphatic hydrocarbon substituents are especially preferred. Each of the aliphatic hydrocarbon substituents may contain 100 or more carbon atoms but usually will have from 1 to 20 carbon atoms. Alkyl and alkenyl groups are the preferred aliphatic hydrocarbon substituents.

Further specific examples of monohydric alcohols which can be used as (b) include monohydric alcohols such as methanol, ethanol, isooctanol, cyclohexanol, behenyl alcohol, neopentyl alcohol, isobutyl alcohol, benzyl alcohol, beta-phenethyl alcohol, 2-methylcyclohexanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, sec-pentyl alcohol, tert-butyl alcohol, and dioleate of glycerol. Alcohols within (b) may be unsaturated alcohols such as allyl alcohol, cinnamyl alcohol, 1-cyclohexene-3-ol and oleyl alcohol.

Other specific examples of alcohols useful as (b) are the ether alcohols and amino alcohols including, for example, the oxyalkylene, oxy-arylene-, amino-alkylene-, and amino-arylene-substituted alcohols having one or more oxyalkylene, aminoalkylene or amino-aryleneoxy-arylene groups. They are exemplified by CELLOSOLVE®, CARBITOL®, phenoxyethanol, heptylphenyl-(oxypropylene)$_6$-OH, octyl-(oxyethylene)$_{30}$-OH phenyl-(oxyoctylene)$_2$-OH, mono-(heptylphenyl-oxypropylene)-substituted glycerol, poly(styrene oxide), aminoethanol, 3-amino-ethylpentanol, di(hydroxyethyl)amine, p-aminophenol, tri(hydroxypropyl)amine, N-hydroxyethyl ethylenediamine, N,N,N',N'-tetrahydroxy-trimethylenediamine, and the like.

The polyhydric alcohols preferably contain from 2 to about 10 hydroxy groups. They are illustrated, for example, by the alkylene glycols and polyoxyalkylene glycols mentioned above such as ethylene glycol, triethylene glycol, tetraethylene glycol, dipropylene glycol, dibutylene glycol, and other alkylene glycols and polyoxyalkylene glycols in which the alkylene groups contain 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used as (b). The carbohydrates may be exemplified by glucose, fructose, sucrose, rhamnose, mannose, glyceraldehyde, and galactose.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful as (b). Further specific examples of such partially esterified polyhydric alcohols are the monooleate of sorbitol, distearate of sorbitol, monooleate of glycerol, monostearate of glycerol, di-dodecanoate of erythritol, and the like.

A preferred class of alcohols suitable as (b) are those polyhydric alcohols containing up to about 12 carbon atoms, and especially those containing 3 to 10 carbon atoms. This class of alcohols includes glycerol, erythritol, pentaerythritol, dipentaerythritol, gluconic acid, glyceraldehyde, glucose, arabinose, heptanediols, hexanetriols, butanetriols, guinic acid, 2,2,6,6-tetrakis-(hydroxymethyl)cyclohexanol, 1,10-decanediol, digitalose, and the like. Aliphatic alcohols containing at least three hydroxyl groups and up to 10 carbon atoms are particularly preferred.

An especially, preferred class of polyhydric alcohols for use as (b) are the polyhydric alkanols containing 3 to 10 carbon atoms and particularly, those containing 3 to 6 carbon atoms and having at least three hydroxyl groups. Such alcohols are exemplified by glycerol, erythritol, pentaerythritol, mannitol, sorbitol, 2-hydroxymethyl-2-methyl-1,3-propanediol(trimethylolethane), 2-hydroxy-methyl-2-ethyl-1,3-propanediol(trimethylpropane), 1,2,4-hexanetriol, and the like.

From what has been stated above, it is seen that (a) may contain alcoholic hydroxy substituents and (b) can contain primary, secondary, or tertiary amino substituents. Thus, amino alcohols can fall into both (a) and (b) when they contain at least one primary or secondary amino group. If only tertiary amino groups are present, the amino alcohol belongs only in (b).

U.S. Pat. Nos. 3,381,022; 3,522,179; 3,542,680 and 3,697,428, each of which is expressly incorporated herein by reference, disclose details of procedures for reacting hydrocarbon based acylating agents with alcohols.

Reactive Metals

Reactive metals or reactive metal compounds useful as (c) are those which will form carboxylic acid metal salts with the carboxylated copolymers of this invention and those which will form metal-containing complexes with the carboxylic derivative compositions produced by reacting the carboxylated copolymers with amines and/or alcohols as discussed above.

Reactive metal compounds useful for preparing metal salts of carboxylated copolymers of this invention include those salts containing metals selected from the group consisting of Group I metals, Group II metals, Al, Pb, Sn, Co and Ni. Examples of compounds include the oxides, hydroxides, alcoholates, and carbonates of Li, Na, K, Ca, Ba, Pb, Al, Sn, Ni and others. While reactive metals may also be employed, it is generally more convenient, and often more economical to employ the metal salts as reactants. An extensive listing of reactive metal compounds useful for preparing the metal salts of the carboxylated copolymers is provided in U.S. Pat. No. 3,271,310 (LeSuer) which is expressly incorporated herein by reference.

Reactive metal compounds useful as (c) for the formation of complexes with the reaction products of the acylating reagents of this invention and amines are disclosed in U.S. Pat. No. 3,306,908. Complex-forming metal reactants useful as (c) include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt nickel, copper and zinc). These metals are the so-called transition or coordination metals, i.e., they are capable of forming complexes by means of their secondary or coordination valence. Specific examples of the complex-forming metal compounds useful as the reactant in this invention are cobalt, cobaltous oxide, cobaltous chloride, cobaltic chloride, chromous acetate, chromic acetate, chromic sulfate, chromic hexanoate, manganous acetate, manganous benzoate, manganous nitrate, ferrous acetate, ferric benzoate, ferrous bromide, nickel nitrate, nickel dioleate, nickel stearate, cupric benzoate, cupric formate, cupric nitrite; zinc benzoate, zinc borate, zinc chromate, cadmium benzoate, cadmium carbonate, cadmium butyrate. Hydrates of the above compounds are especially convenient for use in the process of this invention.

U.S. Pat. No. 3,306,908 is expressly incorporated herein by reference for its discussion of reactive metal compounds suitable for forming such complexes and its disclosure of processes for preparing the complexes. Basically, those processes are applicable to the carboxylic derivative compositions of the acylating reagents of this invention with the amines as described above by substituting, or on an equivalent basis, the acylating reagents of this invention with the high molecular weight carboxylic acid acylating agents disclosed in U.S. Pat. No. 3,306,908. The ratio of equivalents of the acylated amine thus produced and the complex-forming metal reactant remains the same as disclosed in U.S. Pat. No. 3,306,908.

U.S. Pat. No. 3,271,310 which is expressly incorporated herein by reference describes suitable reactive metal compounds and details of processes for reacting them with hydrocarbon based acylating agents.

U.S. Pat. Nos. 3,836,469; 3,836,470 and 3,836,471 which are expressly incorporated herein by reference provide details of reactions of (a) amines characterized by the presence within their structure of at least one condensable H—N< group, (b) alcohols, (c) reactive metals or reactive metal compounds, and (d) a combination of two or more of any of (a) through (c), the components of (d) having been reacted simultaneously or sequentially, in any order with hydrocarbon based acylating agents.

The following examples illustrate products of the instant invention. All parts are parts by weight, temperatures are in degrees Celsius, and pressures are atmospheric. The relationship between parts by weight and parts by volume is as grains to milliliters. Filtrations are conducted employing a diatomaceous earth filter aid. All analytical values are by analysis.

EXAMPLE 1

Butadiene-Isobutylene Copolymer

A reactor is charged with 88.6 parts isobutylene, 159 parts butadiene and 1375 parts by volume hexanes. The mixture is allowed to reflux at 15° C. Over 2 hours 7 parts $AlCl_3$, 1188.4 parts isobutylene and 49.5 parts butadiene are added to the reactor maintaining the reflux at 15° C. The reaction mixture is drained into 100 parts methanol. After the bulk of the unreacted monomers have boiled off (overnight), 150 parts water are added to the crude reaction product. The mixture is stirred and then shaken in a separatory funnel followed by removal of the aqueous layer. The organic layer is washed twice more with 150 parts water and finally with 100 parts saturated NaCl solution. The organic phase is dried with $MgSO_4$ and pressure filtered. Solvents are removed on a rotary evaporator. The yield of product is 1167.4 parts. GPC $\overline{M}_n$=2852 and $\overline{M}_w$=9267. By $^1H$ NMR the product contains 3.08% butadiene.

EXAMPLE 2

Butadiene-Isobutylene Copolymer Succinic Anhydride

A reactor is charged with 2413.2 parts of a butadiene-isobutylene copolymer prepared as in Example 1. The materials are heated to 200° C. collecting 1 part volatiles. The polymer is allowed to cool to room temperature then 124.2 parts maleic anhydride are added. The materials are heated to 200° C. held at temperature for a total of 20 hours. At 150° C. the reactor is evacuated to 20 torr followed by heating to 205° C. then maintained at temperature for 0.5 hour while collecting 20 parts distillate. The residue is the product. The product has Total Acid Number (TAN) by potentiometric titration=19.43, TAN by Na Methoxide titration=37.15, free maleic anhydride=0.071%, saponification no. (ASTM D94)=41.0, kinetic viscosity @ 100° C. (D445-100)=9853.0 centistokes (cSt), Cl (X-ray fluorescence (XRF)=83 ppm, % unreacted polymer (Thin layer chromatography using flame ionization detector (TLC-FID))=30.

EXAMPLE 3

Butadiene-Isobutylene Copolymer Succinimide

A reactor is charged with 1576.9 parts mineral oil, 50.13 parts triethylenetetramine and 17.92 parts ethylene polyamine bottoms containing 31.5% N (HPA-X, Union Carbide). The mixture is heated to 150° C. Over 1 hour, 2065.2 parts of the succinic anhydride from Example 2 diluted in 1503.6 parts mineral oil is added to the reactor. The mixture is held for a total of 6.5 hours at 150° C. The product is filtered. The product has total base number (TBN)=7.16, TAN (potentiometric titration)=0.25, % N=0.4270 and kinetic viscosity @100° C. (D445-100) =275.44 cSt

EXAMPLE 4

Butadiene-Isoprene-Isobutylene Terpolymer

A reactor is charged with 6.34 parts isoprene, 255.8 parts isobutylene, 164.2 parts butadiene and 1000 parts by volume heptane. The mixture is allowed to reflux, 6.3° C. Over 2 hours, 2.9 parts $AlCl_3$, 30.6 parts isoprene, 1188.4 parts isobutylene and 24.3 parts butadiene are added to the reactor maintaining the reflux at 6.3° C. The reaction mixture is drained into 100 parts methanol. After the bulk of the unreacted monomers has boiled off (overnight), 150 parts water are added to the crude reaction product. The mixture is stirred and then shaken in a separatory funnel. The aqueous layer is removed then the organic layer is washed twice more with 150 parts water and finally with 100 parts saturated aqueous NaCl solution. The organic phase is dried with $MgSO_4$ and pressure filtered. Solvents are removed on a rotary evaporator. The yield of product is 1185.6 parts. The product has GPC $\overline{M}_n$=3504 and $\overline{M}_w$=14956. By $^1$H NMR the product contains 2.14% butadiene and 1.01% isoprene.

EXAMPLE 5

Butadiene-Isoprene-Isobutylene Terpolymer Succinic Anhydride

A reactor is charged with 398 parts of the terpolymer of Example 4 which is heated to 203° C. collecting 2 parts volatiles. The polymer is allowed to cool to room temperature then 16.8 parts maleic anhydride are added. The materials are heated to 203° C., held at temperature for 20 hours then stripped for 1 hour at 210° C. and 10 mm Hg, collecting 5.5 parts distillate. The residue is the product having TAN (potentiometric titration)=13.4, TAN (NaMethoxide titration)=28 and % unreacted terpolymer (TLC-FID)=20.

EXAMPLE 6

Butadiene-Isoprene-Isobutylene Terpolymer Succinimide

A reactor is charged with 301 parts butadiene-isoprene-isobutylene terpolymer succinic anhydride from example 5 and 460 parts mineral oil. The mixture is heated to 110° C. Over 0.5 hour, 7.1 parts of a polyamine mix of 80% HPA-X amine bottoms and 20% triethylenetetramine are added to the reactor followed by addition of 767 parts mineral oil. The materials are heated to 155° C. and maintained at temperature for 5 hours. The materials are filtered The filtrate is the product having TBN=2.64, TAN (potentiometric titration) =0.47 and % N=0.1570.

EXAMPLE 7

Isobutylene-Isoprene Copolymer

A reaction flask is dried and charged with 600 parts by volume hexanes and 3.0 parts $AlCl_3$. The system is flushed with $N_2$. This mixture is stirred then cooled to 0° C. This temperature is maintained throughout the entire reaction. Addition of monomers (isobutylene rate=5.6 parts/min; isoprene rate=1.0 part by volume/min) is begun. The isobutylene is condensed with a Dry Ice/acetone cold finger. After 1 hr. an additional 200 parts by volume hexanes are added and the above conditions are maintained for an additional 1 hr. At the end of the second hour 1.0 part $AlCl_3$ is charged into the reaction flask along with 400 parts, by volume hexanes which are added dropwise over the next hour. This is repeated every 60 minutes for a total of 625 minutes, the total time required to add 3500 parts isobutylene and 625 parts by volume (425 parts by weight) isoprene. The total $AlCl_3$ added is 10 parts.

During the addition, as the reaction flask becomes ⅔ full, the reaction solution is removed slowly at a rate equal to the volume being added to the flask (the 2 monomers and hexanes). The solution is slowly drawn into a suction flask which contains 100 parts by volume methanol Removal is continued at the same rate until all the monomers are added and all the reaction mixture has been siphoned out.

The quenched reaction mixture is charged into a separatory funnel and the organic layer is washed 3 times with water The washed organic layer is poured into a flask. The volatile components are slowly-removed and the residue is stripped at 200° C. and 1.0 mm Hg for 2 hours. The residue is the product, a clear light yellow thick liquid when hot, extremely thick at room temperature. The product yield is 2880 parts. The product has GPC $\overline{M}_n$=3167, $\overline{M}_w$=10,768 and polydispersity=3.40.

EXAMPLE 8

Isobutylene-Isoprene Copolymer Succinic Anhydride

A flask is charged with 2683 parts of polymer of Example 7 and 145.3 parts maleic anhydride. The mixture is heated to 203° C. and is maintained for 24 hours while stirring with a $N_2$ backpressure. The product is stripped at 210° C. and 1.0 mm Hg for 1.5 hours. The product, a very thick brown liquid, has TAN (potentiometric titration)=18.4, TAN (NaMethoxide titration)=38.2, free maleic anhydride=0.036%, % unreacted polymer (TLC-FID)=23.45.

EXAMPLE 9

Isobutylene-Isoprene Copolymer Succinimide

A flask is charged with 71.05 parts triethylenetetramine and 1236.6 parts mineral oil. This mixture is heated to 150° C. with stirring and $N_2$ flush. In a separate container 2260 parts of the succinic anhydride of Example 8 are dissolved in 2260 parts mineral oil at 150° C. The oil mixture at 150° C. is added over 1 hour to the 150° C. reaction flask containing the amine/oil mixture. After the addition, the mixture is held at 155° C. for 5 hours while stirring under $N_2$. The product is filtered hot yielding a clear dark brown thick liquid having TBN=8.0, TAN (potentiometric titration) =0.19, % N=0.38, and kinetic viscosity at 100° C. (D445-100)=338 cSt.

EXAMPLE 10

Isobutylene-Isoprene Copolymer Succinic Ester

A reactor is charged with 300 parts of an oil solution (58% oil) of a succinic anhydride prepared as in Example 8. The anhydride has TAN (potentiometric titration)=6.8. To this oil solution are added 136.7 parts mineral oil and 4.5 parts pentaerythritol. This mixture is heated to 205° C. with stirring and subsurface $N_2$ blowing for 12.5 hours. The mixture is cooled to 190° C. whereupon 0.75 parts of a polyamine mixture containing 34% N is added followed by heating at 190° C. for 2 hours. The materials are filtered hot. The filtrate has TBN=1.1, TAN (potentiometric titration) =1.084, % N=0.087 and kinematic viscosity at 100° C. (D445-100)=298.1.

EXAMPLE 11

Isobutylene-Isoprene Copolymer

A mixture of 10,000 parts hexanes and 2156 parts by volume isoprene is prepared and set aside. A 2 liter resin kettle with exit port is dried and placed under $N_2$. To the dried kettle are added 500 parts by volume hexanes the 1.0 part $AlCl_3$. The materials are stirred and cooled to 0° C. This temperature is maintained throughout the reaction. Isobutylene addition is begun at 16.8 parts/minute followed within 10 seconds of the hexanes/isoprene mixture at 4.49 parts by volume/minute. As the reaction mixture reaches the exit port, it spills over into a flask containing 1000 parts by volume of methanol. After every 20 minutes of addition time 1.0 parts $AlCl_3$ is charged to the reaction mixture in the resin kettle (total 24 parts). This continuous reaction process is continued for 8 hours. The materials are collected and placed in a separatory funnel. The materials are washed with water, the resulting organic layer is washed 2 more times then is dried with $MgSO_4$ and filtered. The bulk of the solvent is distilled off then the residue is deep stripped at 200° C. at 1 mm Hg for 2 hours. The residue has GPC $\overline{M}_n$=3174, $\overline{M}_w$=10,768 and polydispersity=3.40. By $^1$H NMR the product contains 5.27% isoprene units.

EXAMPLE 12

Isobutylene-Isoprene Copolymer Succinic Anhydride

A reactor is charged with 6025 parts of the isobutylene-isoprene copolymer of Example 11 and 204.6 parts maleic anhydride. The materials are heated to 200° C. and the temperature is maintained for 7 hours. The product has TAN (potentiometric titration)=18.9, TAN (sodium methoxide titration)=36.7, 0.14% free maleic anhydride, Saponification No. (ASTM D-94)=39.3, kinematic viscosity at 100° C. (D445-100),=8299 cSt, 24 ppm Cl, and 27.8% unreacted copolymer.

EXAMPLE 13

Isobutylene-Isoprene Copolymer Succinimide

A reactor is charged with 3545.9 parts of mineral oil, 27.37 parts triethylenetetramine, and 87.77 parts polyethylene polyamine bottoms (HPA-X). After the materials are mixed and heated to 150° C., 3000 parts of the succinic anhydride of Example 12 in 1000 parts mineral oil are added over 1 hour. The temperature is maintained for 4 hours followed by filtration. The filtrate has TBN=11.81, TAN (potentiometric titration) 0.776, 0.489% N and kinematic viscosity at 100° C. (D445-100)=350.7.

EXAMPLE 14

Isobutylene-Isoprene Copolymer ($EtAlCl_2$)

A 3L flask is charged with 600 parts by volume of hexanes and cooled it to 0° C. with a dry ice bath. This temperature, 0° C., is maintained through the polymerization. Once 0° C. is reached the reactor is charged with 3 parts by volume of 1.0M $EtAlCl_2$ solution in hexanes.

Isobutylene is condensed (a dry ice cold finger is used to condense the isobutylene) prior to the reaction flask. The addition of isobutylene is started at a rate of 5.61 g/min followed by isoprene feed at 1.0 parts by volume/min starting 15 seconds after the isobutylene. The monomer addition is continued for 2 hours. Using a syringe pump, the remaining 10.4 parts by volume of $EtAlCl_2$ solution is added over the entire 2 hour addition period.

After 0.5 hour addition time, 200 parts by volume of hexanes are added over the next 30 minutes then 400 parts by volume hexanes are added over the next hour. After 120 minutes, the isobutylene and isoprene additions are completed, the reaction mixture is stirred for an additional 0.25 hour at 0° C. followed by quenching the catalyst with 100 parts by volume methanol.

The entire solution is poured into a separatory funnel and washed 3 times with water. The organic layer is dried with $MgSO_4$ and filtered giving a clear colorless thin liquid. The mixture is then concentrated by removing hexanes giving a yield of 62%. The residue has GPC $\overline{M}_n$=4732, $\overline{M}_w$=12,223 and polydispersity=2.6. A total of 672 parts (12 moles) isobutylene, 81.2 parts (1.2 moles) of isoprene, 13.4 parts by volume of the $EtAlCl_2$ solution and 1200 parts by volume of hexanes are charged during the reaction.

EXAMPLE 15

Isobutylene-Isoprene Copolymer ($EtAlCl_2$) Succinic Anhydride

The procedure of Example 12 is repeated replacing the isobutylene-isoprene copolymer of Example 11 with the copolymer of Example 14.

EXAMPLE 16

Isobutylene-Isoprene Copolymer ($EtAlCl_2$) Succinimide

The procedure of Example 13 is repeated replacing the succinic anhydride of Example 12 with that of Example 15.

The Oil of Lubricating Viscosity

The lubricating compositions of this invention employ an oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.), alkylated diphenyl ethers and alkylated diphenyl sulfides and the derivatives, analogs and homologues thereof and the like.

Alkylene oxide polymers and interpolymers and derivatives thereof where their terminal hydroxyl groups have been modified by esterification, etherification, etc., constitute another useful class of known synthetic lubricating oils.

Another suitable class of synthetic lubricating oils that can be used comprises the esters of di- and polycarboxylic acids and those made from $C_5$ to $C_{20}$ monocarboxylic acids and polyols and polyolethers.

Other synthetic lubricating oils include liquid esters of phosphorus-containing acids, polymeric tetrahydrofurans and the like, silicon-based oils such as the polyalkyl-, polyaryl-, polyalkoxy-, or polyaryloxy-siloxane oils and silicate oils.

Unrefined, refined and rerefined oils, either natural or synthetic (as well as mixtures of two or more of any of these) of the type disclosed hereinabove can be used in the compositions of the present invention. Unrefined oils are those obtained directly from natural or synthetic sources without further purification treatment. Refined oils are similar to the unrefined oils except they have been further treated in one or more purification steps to improve one or more properties. Refined oils include solvent refined oils, hydrorefined oils, hydrofinished oils, hydrotreated oils, and oils obtained by hydrocracking and hydroisomerization techniques.

Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin, III, U.S. Pat. No. 4,326,972, European Patent Publication 107,282, and A. Sequeria, Jr., Lubricant Base Oil and Wax Processing, Chapter 6, Marcel Decker, Inc., New York (1994), each of which is hereby incorporated by reference for relevant disclosures contained therein.

A basic, brief description of lubricant base oils appears in an article by D. V. Brock, "Lubrication Engineering", Volume 43, pages 184–5, March 1987, which article is expressly incorporated by reference for relevant disclosures contained therein.

Other Additives

As mentioned, lubricating oil compositions of this invention may contain other components. The use of such additives is optional and the presence thereof in the compositions of this invention will depend on the particular use and level of performance required. Thus the other additive may be included or excluded.

The compositions may comprise a metal salt, frequently a zinc salt of a dithiophosphoric acid. Zinc salts of dithiophosphoric acids are often referred to as zinc dithiophosphates, zinc O,O'-dihydrocarbyl dithiophosphates, and other commonly used names. They are sometimes referred to by the abbreviation ZDP. Especially preferred are secondary alkyl ZDP. One or more zinc salts of dithiophosphoric acids may be present in a minor amount to provide additional extreme pressure, anti-wear and anti-oxidancy performance. Other metal salts of dithiophosphoric acids, such as copper, antimony, etc. salts are known and may be included in the lubricating oil compositions of this invention. Especially preferred are secondary alkyl ZDP.

In addition to zinc salts of dithiophosphoric acids discussed hereinabove, other additives that may optionally be used in the lubricating oils of this invention include, for example, detergents, dispersants, viscosity improvers, oxidation inhibiting agents, pour point depressing agents, extreme pressure agents, anti-wear agents, color stabilizers and anti-foam agents. The above-mentioned dispersants and viscosity improvers may be used in addition to the compositions of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Phenolic compounds and aromatic amines are useful oxidation inhibitors. Preferred are hindered phenolic compounds, for example, 2,6-di-tertiary butyl phenol and secondary aromatic amine compounds, for example N,N-di (alkylphenyl)amines.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, diene polymers, polyalkyl styrenes, esterified styrene-maleic anhydride copolymers, alkenylarene-conjugated diene copolymers and polyolefins. Multifunctional viscosity improvers, other than those of the present invention, which also have dispersant and/or anti-oxidancy properties are known and may optionally be used in addition to the products of this invention. Such products are described in numerous publications including those mentioned in the Background of the Invention. Each of these publications is hereby expressly incorporated by reference.

Pour point depressants are often included in the lubricating oils described herein. See for example, page 8 of 'Lubricant Additives" by C. V. Smalheer and R. Kennedy Smith (Lezius-Hiles Company Publisher, Cleveland, Ohio, 1967). Pour point depressants, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| |
|---|
| 3,163,603 |
| 3,184,474 |
| 3,215,707 |
| 3,219,666 |
| 3,271,310 |
| 3,272,746 |
| 3,281,357 |
| 3,306,908 |
| 3,311,558 |
| 3,316,177 |
| 3,340,281 |
| 3,341,542 |
| 3,346,493 |
| 3,351,552 |
| 3,381,022 |
| 3,399,141 |
| 3,415,750 |
| 3,433,744 |
| 3,444,170 |
| 3,448,048 |
| 3,448,049 |
| 3,451,933 |
| 3,454,607 |
| 3,467,668 |
| 3,501,405 |
| 3,522,179 |
| 3,541,012 |
| 3,541,678 |
| 3,542,680 |
| 3,567,637 |
| 3,574,101 |
| 3,576,743 |
| 3,630,904 |
| 3,632,510 |
| 3,632,511 |
| 3,697,428 |
| 3,725,441 |
| 4,194,886 |
| 4,234,435 |
| 4,491,527 |
| 5,696,060 |
| 5,696,067 |
| RE 26,433 |

(2) Reaction products of relatively high molecular weight aliphatic or alicyclic halides with amines, preferably polyalkylene polyamines. These may be characterized as "amine dispersants" and examples thereof are described for example, in the following U.S. patents:

| |
|---|
| 3,275,554 |
| 3,438,757 |
| 3,454,555 |
| 3,565,804 |

(3) Reaction products of allyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| |
|---|
| 3,413,347 |
| 3,697,574 |
| 3,725,277 |
| 3,725,480 |
| 3,726,882 |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| |
|---|
| 3,036,003 |
| 3,087,936 |
| 3,200,107 |
| 3,216,936 |
| 3,254,025 |
| 3,256,185 |
| 3,278,550 |
| 3,280,234 |
| 3,281,428 |
| 3,282,955 |
| 3,312,619 |
| 3,366,569 |
| 3,367,943 |
| 3,373,111 |
| 3,403,102 |
| 3,442,808 |
| 3,455,831 |
| 3,455,832 |
| 3,493,520 |
| 3,502,677 |
| 3,513,093 |
| 3,533,945 |
| 3,539,633 |
| 3,573,010 |
| 3,579,450 |
| 3,591,598 |
| 3,600,372 |
| 3,639,242 |
| 3,649,229 |
| 3,649,659 |
| 3,658,836 |
| 3,697,574 |
| 3,702,757 |
| 3,703,536 |
| 3,704,308 |
| 3,708,522 |
| 4,234,435 |

(5) Polymers and copolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

| |
|---|
| 3,329,658 |
| 3,449,250 |
| 3,519,565 |
| 3,666,730 |
| 3,687,849 |
| 3,702,300 |

The above-noted patents are incorporated by reference herein for their disclosures of ashless dispersants.

The above-illustrated additives may each be present in lubricating compositions at a concentration of as little as 0.001% by weight, usually ranging from about 0.01% to about 20% by weight. In most instances, they each contribute from about 0.1% to about 10% by weight, more often up to about 5% by weight.

Additive Concentrates

The various additives described herein can be added directly to the lubricant. Preferably, however, they are diluted with a substantially inert, normally liquid organic diluent such as mineral oil, a synthetic oil such as a polyalphaolefin, naphtha, benzene, toluene or xylene, to form an additive concentrate. These concentrates usually comprise about 0.1 to about 80% by weight of the compositions of this invention and may contain, in addition, one or more other additives known in art or described hereinabove. Concentrations such as 15%, 20%, 30% or 50% or higher may be employed.

Additive concentrates are prepared by mixing together the desired components, often at elevated temperatures, usually less than 150° C., often no more than about 130° C., frequently no more than about 115° C.

The following Examples illustrate several additive concentrates comprising compositions of this invention. All parts are parts by weight and, except for products of examples recited herein, amounts are on an oil or other diluent free basis.

Concentrates I–II

Each of the below listed additive concentrates is prepared by combining 6.76 parts of Zn mixed isopropyl-methyl amyl phosphorodithioate, 5.62 parts calcium overbased (MR 11) $C_{12}$-alkyl benzene sulfonic acid, 3.79 parts calcium overbased (MR 1.2) alkyl benzene sulfonic acid, 6.93 parts calcium overbased (MR 3.5) sulfurized alkyl phenol, 3.79 parts di-(nonyl phenyl) amine, 3.79 parts t-butylated alkyl phenol, 0.76 part oleylamide, 0.07 parts of a kerosene solution of a commercial silicone antifoam, 66.4 parts of the indicated product of this invention and sufficient mineral oil to bring the total weight of the additive concentrate to 100 parts.

|  | Concentrate | |
|---|---|---|
|  | I | II |
| Product of Example: | 3 | 9 |

Lubricating Oil Compositions

The instant invention also relates to lubricating oil compositions containing the carboxylic compositions of the invention. As noted hereinabove, the compositions of this invention may be blended directly into an oil or lubricating viscosity or, more often, are incorporated into an additive concentrate containing one or more other additives which in turn is blended into the oil.

Lubricating compositions of this invention are illustrated by the following Examples. These example are presented for illustrative purposes only, and are not intended to limit the scope of this invention. The lubricating compositions are prepared by combining the specified ingredients, individually or from concentrates, in the indicated amounts and oil of lubricating viscosity to make the total 100 parts by weight. The amounts shown are indicated as parts by weight. Unless indicated otherwise, where components are indicated as parts by weight, they are amounts of chemical present on an oil-free basis. Thus, for example, an additive comprising 50% oil used at 10% by weight in a blend, provides 5% by weight of chemical. Where oil or other diluent content is given, it is for information purposes only and does not indicate that the amount shown in the table includes oil. Amounts of products of examples of this invention are given 'as prepared', including oil content, if any.

EXAMPLES I–II

The following Examples illustrate SAE 5W-30 engine oil compositions of this invention. Each contains 18.45% of the indicated additive concentrate, 1.0% by weight of a 12.5% in oil solution of an olefin copolymer viscosity improver, 0.2% of a polymethacrylate pour point depressant in a basestock made up of 31.1% 6 centistoke polyalphaolefin (Chevron) and 68.9% hydroisomerized 135N oil (Neste).

|  | Lubricant | |
|---|---|---|
|  | A | B |
| Concentrate Example: | I | II |

Lubricant examples A and B each contain 4.9% of neat (oil free) products of this invention.

COMPARATIVE EXAMPLE

An SAE 5W-30 lubricant composition is prepared employing the same components used in Example A and B except it contains 6.3% of the 12.5% in oil solution of olefin copolymer viscosity improver, and 13.2% of an additive concentrate identical to that of Example I except the product of Example 3 is replaced with 4.9% by weight (diluent free basis) of a commercial polyisobutene substituted succinimide.

Viscosity characteristics of lubricants A and B of this invention and the Comparative lubricant are presented in the following table:

|  | Kinematic Viscosity @ 100° C. (mm²/s) ASTM D-445 | HTHS Viscosity (mPa-s) ASTM D-4683 | Cranking Viscosity @ −25° C. (mPa-s) ASTM D-5293 |
|---|---|---|---|
| Lubricant A | 11.03 | 3.26 | 3140 |
| Lubricant B | 12.23 | 3.31 | 3170 |
| Comparative | 11.24 | 3.46 | 3660 |
| SAE 5W-30 Spec. | 9.3–12.5 | 2.9 (min.) | 3500 (max.) |

The lubricants of the instant invention meet all of the viscosity specifications for an SAE 5W-30 oil. This is accomplished employing only 1% by weight of the 12.5% in oil auxiliary viscosity improver. To meet the kinematic viscosity requirements, it was necessary to use over 6 times as much of the auxiliary viscosity improver when the lubricant contains the conventional polyisobutene succinimide dispersant. It is also noted that the cranking viscosity @−25° C. for the comparative lubricant exceeds the maximum specified for SAE 5W-30 oils.

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description.

Nevertheless, all such modifications and reaction products are included within the scope of the present invention; the present invention encompasses the composition prepared by admixing the components described above.

Each of the documents referred to above is incorporated herein by reference. Except in the examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and-lower amount, range, and ratio limits set forth herein may be independently combined. As used herein, the expression "consisting essentially of" permits the inclusion of substances which do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A carboxylic derivative composition derived from a carboxylated isobutylene-isoprene copolymer having $\overline{M}_n$ ranging from about 200 to about 10,000,
said copolymer having thereon from about 0.8 to about 7 moles per mole of copolymer of groups derived from at least one α,β-unsaturated carboxylic acid selected from the group consisting of acrylic acid, methacrylic acid, maleic acid, fumaric acid, crotonic acid, citraconic acid, itaconic acid, mesaconic acid, and anhydrides, halides, and esters of the foregoing acids, reacted with at least one of
(a) amines characterized by the presence within their structure of at least one condensable H—N< group,
(b) alcohols,
(c) reactive metals or reactive metal compounds, and
(d) a combination of two or more of any of (a) through (c), the components of (d) having been reacted with the carboxylated isobutylene-isoprene copolymer simultaneously or sequentially, in any order.

2. The carboxylic derivative composition of claim 1 wherein the copolymer has an average of from about 0.9 to about 5 carbon-to-carbon double bonds per mole thereof.

3. The carboxylic derivative composition of claim 2 wherein from about 25% to about 100% of the double bonds are terminal double bonds.

4. The carboxylic derivative composition of claim 1 wherein the copolymer comprises an average of from about 0.25 to about 5 moles of units derived from polyene per mole of copolymer.

5. The carboxylic derivative composition of claim 4 wherein the copolymer comprises an average of from about 0.5 to about 2.5 moles of units derived from polyene per mole of copolymer.

6. The carboxylic derivative composition of claim 1 wherein the α,β-unsaturated carboxylic acid or anhydride thereof comprises maleic anhydride.

7. The carboxylic derivative composition of claim 1 wherein the carboxylated copolymer has been reacted with (a) the amine.

8. The carboxylic derivative composition of claim 7 wherein the amine comprises an alkylene polyamine.

9. The carboxylic derivative composition of claim 1 wherein the carboxylated copolymer has been reacted with (b) an alcohol.

10. The carboxylic derivative composition of claim 1 wherein the carboxylated copolymer has been reacted with (c) reactive metals or reactive metal compounds.

11. A process for preparing a carboxylic derivative composition, said process comprising reacting an isobutylene-isoprene copolymer having $\overline{M}_n$ ranging from about 200 to about 10,000,
with at least one α,β-unsaturated carboxylic acid selected from the group consisting of acrylic acid, methacrylic acid, maleic acid, fumaric acid, crotonic acid, citraconic acid, itaconic acid, mesaconic acid, and anhydrides, halides, and esters of the foregoing acids to form a carboxylated copolymer,
then reacting said carboxylated copolymer with at least one of
(a) amines characterized by the presence within their structure of at least one condensable H—N< group,
(b) alcohols,
(c) reactive metals or reactive metal compounds, and
(d) a combination of two or more of any of (a) through (c), the components of (d) being reacted with the carboxylated isobutylene-isoprene copolymer simultaneously or sequentially, in any order.

12. The process of claim 11 wherein the reacting of the isobutylene-isoprene copolymer with the α,β-unsaturated carboxylic acid, anhydride, halide, or ester is conducted in the presence of chlorine.

13. The process of claim 11 wherein the reacting of the isobutylene-isooprene copolymer with the α,β-unsaturated carboxylic acid, anhydride, halide, or ester is conducted in the substantial absence of chlorine.

14. A product prepared by the process of claim 11.

15. A lubricating oil composition comprising from about 5 to about 80% of the carboxylic derivative composition of claim 1 and from about 95 to about 20% of at least one normally liquid, substantially inert, organic diluent.

16. A lubricating oil composition comprising a major amount of an oil of lubricating viscosity and a minor amount of the carboxylic derivative composition of claim 1.

17. The lubricating oil composition of claim 16 wherein said carboxylic derivative composition is the sole viscosity improver present in the lubricating oil composition.

18. A method for increasing the viscosity index of a lubricating oil composition comprising incorporating into said composition a minor, viscosity improving amount, of the carboxylic derivative composition of claim 1.

19. The method of claim 18 wherein the viscosity improving amount reduces the amount of polymeric viscosity improver needed to attain a specified viscosity index in the lubricating oil composition.

20. A method of reducing soot-induced thickening of a lubricating oil composition, said method comprising incorporating into said composition a minor, soot-thickening reducing amount of the carboxylic derivative composition of claim 1.

* * * * *